Aug. 5, 1958 J. A. FARMWALD ET AL 2,846,002
CUTTING MECHANISM
Filed April 5, 1956 2 Sheets-Sheet 2
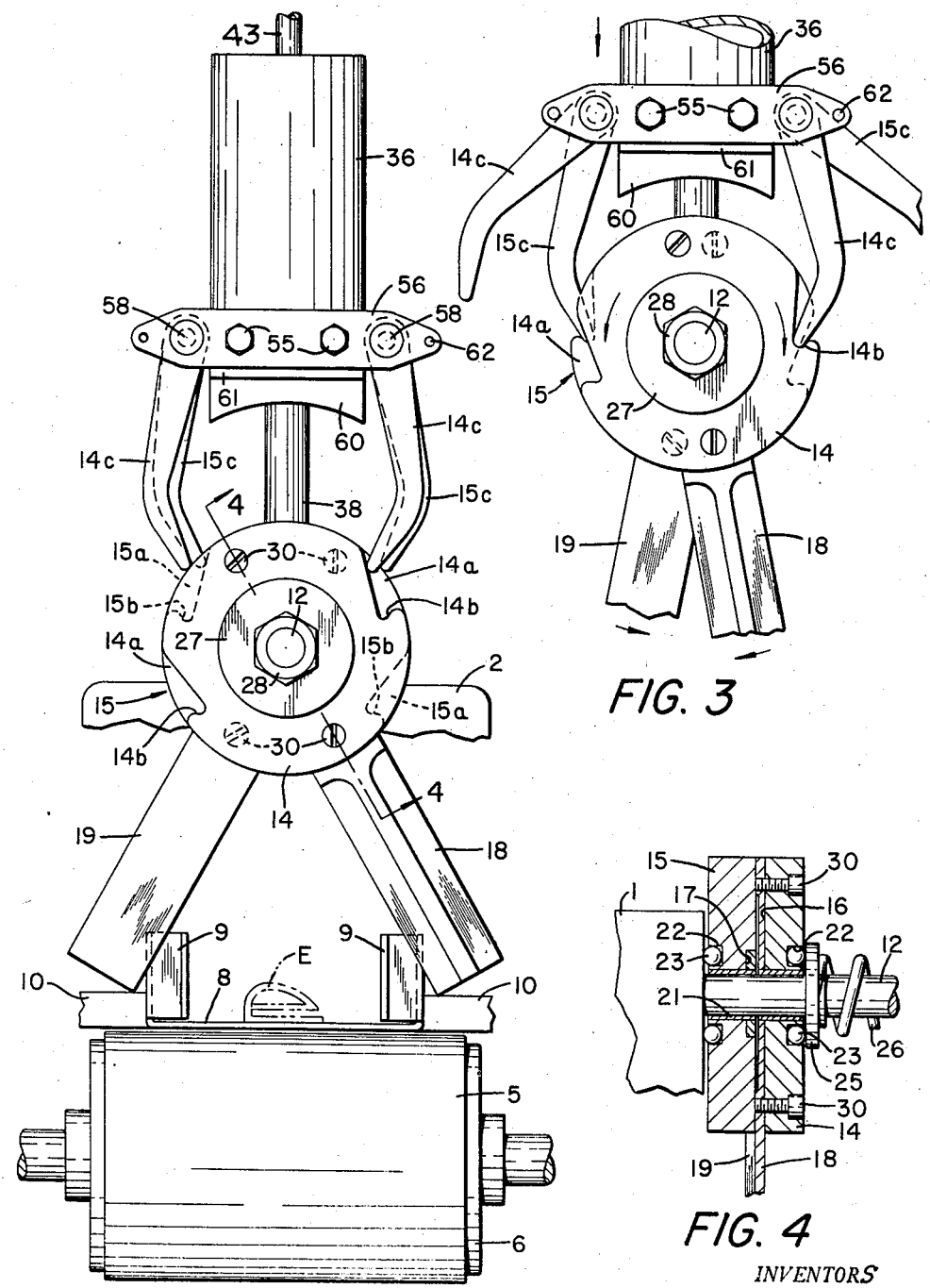
FIG. 2
FIG. 3
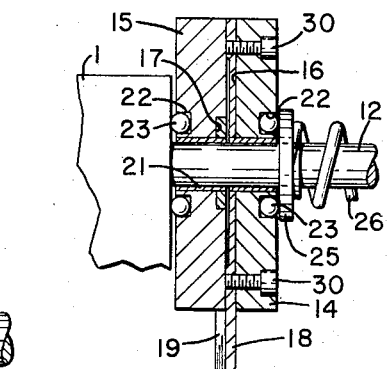
FIG. 4
INVENTORS
JOHN A. FARMWALD &
BY NELSON R. MILLER
Brennan B. West
ATTORNEY United States Patent Office 2,846,002
Patented Aug. 5, 1958

2,846,002

CUTTING MECHANISM

John A. Farmwald and Nelson R. Miller, Middlefield, Ohio, assignors to The Johnson Rubber Company, Middlefield, Ohio, a corporation of Ohio Application April 5, 1956, Serial No. 576,491

9 Claims. (Cl. 164—41)

This invention consists of a unique cutting mechanism peculiarly suited, though not necessarily limited, to the severing of uncured extrusions of rubber or similar material into lengths, while the material is being continuously expelled from an extruding machine.

A novel and outstanding feature of our invention lies in the use of two double edge shear blades that are mounted for relative movement in reverse directions past, and in cutting relation to, each other so that the two blades cooperate to perform a cutting operation each time they are relatively moved past each other.

An object of the invention is to provide cutting mechanism characterized by the foregoing feature and incorporating actuating means of instantaneous action for operating the blades.

Another object of the invention is to provide cutting mechanism involving two double edge shear blades, characterized by the blade arrangement and action aforesaid, and that includes means beyond the reach of the blades for supporting an object to be cut, and further means adjacent the plane of movement of the blades for positioning the object so that its cross section is entirely within the cutting area of the blades.

Another object of the invention is to provide cutting mechanism that acts so quickly and efficiently that it is capable of severing uncured extrusions of rubber or similar material while the material is being continuously expelled from an extruding machine at conventional speed, and without having to reciprocate the mechanism so as to intermittently advance it with the extrusion during the cut, as has heretofore been done, and without distorting the shape of the extrusion in the vicinity of the cut, even in cases where the extrusions are of intricate cross-sectional design, and may include hollow and undercut portions.

Further and more general objects are to provide cutting mechanism of the character above set forth that is thoroughly reliable; that is durable in service, and that is of simple and economical construction, the same being composed of relatively few parts that are very easy to assemble and equally convenient to disassemble when occasion requires.

The foregoing objects and advantages, with others hereinafter appearing, are attained in the embodiment of the invention illustrated in the accompanying drawings, and while we shall proceed to describe said embodiment in detail, we wish it to be understood that the invention is not limited to the structural features shown further than is required by the scope of the claims appended hereto.

In the drawings, wherein like reference characters designate like parts throughout the several views, Fig. 1 is a side elevational view of our improved cutting mechanism, parts being broken away to better show the character of the structure;

Fig. 2 is a front elevation of the mechanism;

Fig. 3 is a fragmentary view similar to Fig. 2, showing the position of the parts shortly after the start of a cutting operation;

Fig. 4 is a section on the line 4—4 of Fig. 2, and

Fig. 5 is a perspective view of one of the double edge blades.

Figure 1:
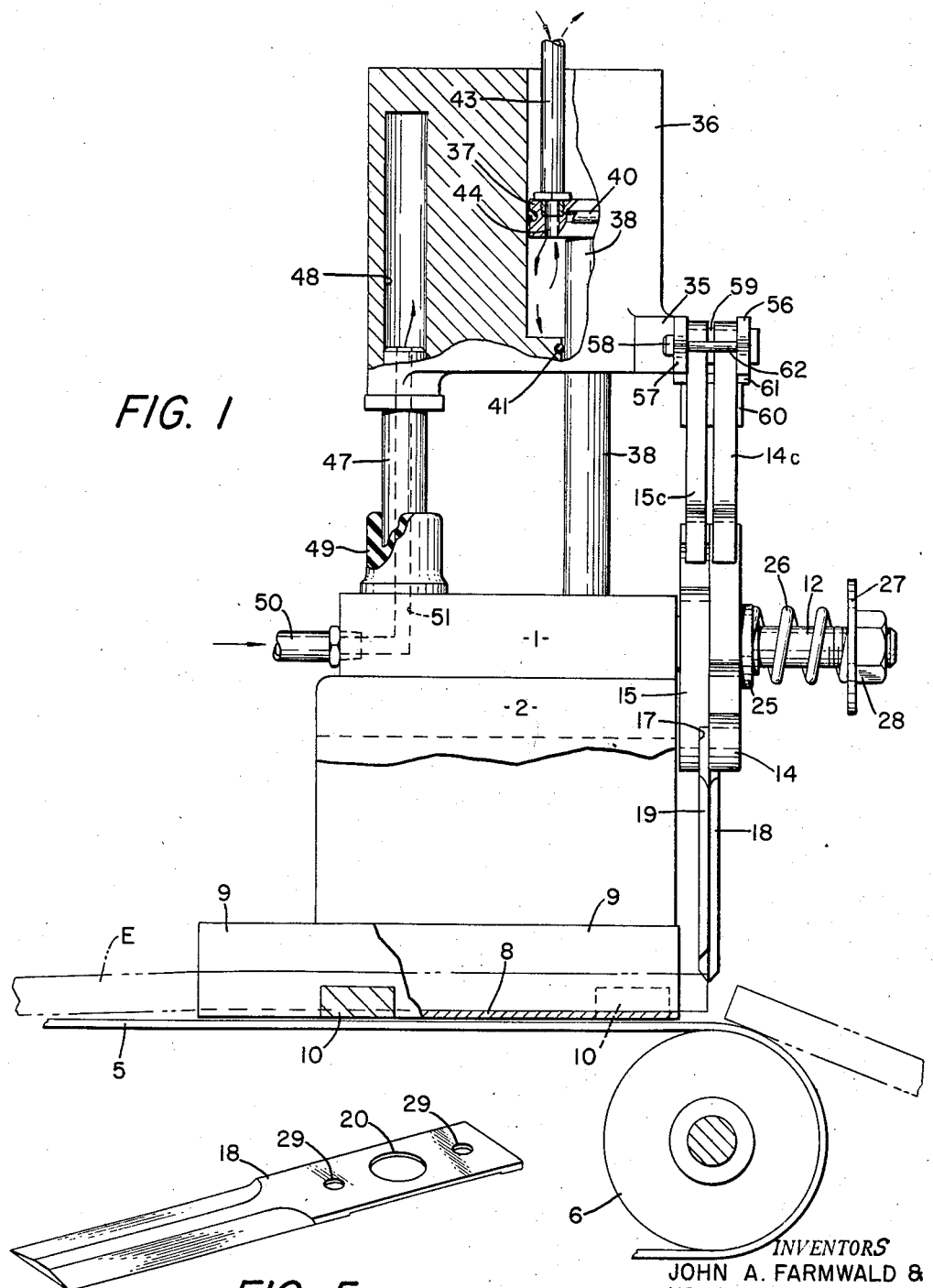

1 denotes a base that forms a part of the supporting frame or structure of the cutting mechanism, and it surmounts a housing 2 that is suitably attached to the framework of a belt conveyor wherewith the invention is associated in the present instance. The conveyor includes a belt 5 that passes about a roller 6 and carries the extrusion E that is to be cut into lengths, it being understood that the extrusion is fed directly from an extruding machine onto the belt 5. In practice, as the lengths are severed from the extrusion they are deposited directly upon a tray or pallet by which they may be carried to a place of curing. The traction between the uncured extrusion and the belt 5 is sufficient to feed the extrusion across a plate 8 that lifts the extrusion from the belt in advance of the cutting blades, so that the cross section of the extrusion is entirely within the cutting area of the blades. The plate 8 has forwardly convergent upstanding side flanges 9 that serve to keep the extrusion substantially central of the cutting machine, and said plate is sustained by brackets 10 that may be anchored to the housing 2, or to some part of the framework of the conveyor.

Extending forwardly from the base 1 is a pivotal member or stud 12, whereon two blade carriers, a front and a rear 14 and 15, respectively, are mounted for oscillation. The carriers 14 and 15 are desirably in the form of discs and are identical, each being reversed with respect to the other, and their adjacent faces are provided with shallow, diametrical channels 16 and 17 that are occupied by the shank portions of double edge shear blades 18 and 19. Said blades are alike, one being shown in perspective in Fig. 5. The shank of each blade is provided with an aperture 20 that is occupied by one end of a bushing 21, as shown in Fig. 4. Said bushing lines an axial bore of the corresponding blade carrier and has bearing on the pivotal member or stud 12. Each of the carriers 14 and 15 is provided with an annular race 22 that is concentric with the axis of oscillation of the carrier, and anti-friction elements or balls 23 occupy said race. The elements or balls 23 of the rear carrier 15 are shown as contacting the front end of the base 1, while those of the front carrier are engaged by a spring seat 25. A helical spring 26, that surrounds the pivotal member or stud 12, is compressed between the spring seat and an abutment 27 on the member or stud 12. In the present embodiment, the abutment 27 consists of a washer that is backed up by a nut 28 that is threaded on the end of the member or stud 12. Thus it will be seen that the carriers, while free to oscillate on the pivotal member or stud 12, are urged toward each other by the spring 26 so as to maintain the shear blades 18 and 19 in contact with each other at all times. Outwardly of its shank, each blade is chamfered on one face along its lateral edges while its opposite face is flat from edge to edge. The flat faces of the blades sweep across each other as the blades function in a cutting operation. The adjacent faces of the shanks of the two blades are desirably relieved for a considerable distance on each side of the aperture 20 so as to reduce friction. Threaded holes 29 are formed in each blade adjacent the ends of its shank for the reception of screws 30 that extend freely through holes in the carriers 14 and 15, the holes being counterbored on the exposed sides of the carriers for the accommodation of the heads of the screws.

The carriers 14 and 15 are each provided with the respective diametrically opposite peripheral notches 14a, and 15a. At one of their ends, the notches are undercut to define abutments designated, respectively, 14b, and 15b. As will be observed from Figs. 2 and 3, the abutments of each carrier are in a plane that is substantially normal to the axis of the blade sustained by said carrier.

35 denotes a head that is supported above the base 1 for movement toward and from the latter, and this head supports the means by which, through the intervention of their carriers, the two double edge shear blades are caused to move to and fro in reverse directions past and in cutting relation to each other so that the two blades cooperate to perform a cutting operation each time they are relatively moved past each other. We may mention at this point that each blade is moved first in one direction and then in the other by reason of successive depressions of the head 35, as will more fully appear hereinafter, the blades remaining inactive during the upward movements of the head.

In the present disclosure of the invention we show pressure fluid means for actuating the cutting mechanism, said means being similar to that which constitutes the subject matter of a copending application of John A. Farmwald and Smith M. Johnson, Serial No. 506,049, filed May 4, 1955, now Patent No. 2,816,608. The head 35 is equipped with an upwardly opening cylinder 36 within which a piston 37 is supported in a fixed position by a rod 38 that is secured to and rises from the base 1 through an aperture in that portion of the head 35 that constitutes the bottom wall of the cylinder 36. The piston is fitted with a so-called O ring 40 that engages the peripheral wall of the cylinder, and a second O ring 41 surrounds the rod 38 and is confined within a channel of the bottom wall of the cylinder. Under the control of a valve (not shown), pressure fluid, such as compressed air, is adapted to be conveyed to and from the part of the cylinder 36 below the piston 37 by a conduit or pipe 43 that is shown as connected to the piston in register with the port 44 thereof.

Secured to and rising from the base 1, rearwardly of and in parallel relation to the rod 38, is a guidepost 47, the upper end of which operates in the manner of a piston within a bore 48 in the head 35, which, in effect, constitutes a cylinder. A bumper 49 that may consist of a sleeve of resilient material, such as rubber, surrounds the bottom of the post 47 and rests upon the base and takes the thrust of the head when the latter is depressed. Means are provided for conducting pressure fluid from a suitable source, under the control of a valve (not shown) to the bore 48, said means, in the present case, including a pipe 50 that is connected to the base 1 and communicates with a passageway 51 that leads through the adjacent part of the base and upwardly through the post and opens at its upper end into the bore.

It is evident from the foregoing, that when pressure fluid is admitted to the working portion of the cylinder 36 and simultaneously permitted to escape from the bore 48, the head 35 will be depressed, and when these conditions are reversed, the head will be elevated.

While the pressure fluid actuator above described is especially well adapted to our purpose, it will be understood that other suitable means may be substituted therefor.

We will now describe the means by which the positions of the blade carriers and blades are reversed each time the head 35 is depressed. Attached to the front end of the head 35, as by fastening means or screws 55, are a front plate 56 and a rear plate 57; and pivotally supported from these plates are a pair of front arms 14c, for cooperation with the corresponding blade carrier 14, and a pair of rear arms 15c that cooperate with the rear blade carrier 15. According to the present construction, the arms are mounted for free swinging movement on pivot pins 58 that are supported by and between the beforementioned plates, a spacer 59 being carried by the corresponding pivot pin between the arms of each pair. When the parts of the mechanism are in normal position, as between cutting operations, the arms hang lax with their free or distal ends bearing against peripheral portions of the blade carriers 14 and 15. As will be seen by reference to Fig. 2, the left hand arm 14c engages the edge of the blade carrier 14 a distance above the corresponding notch 14a, while the right hand arm 14c occupies the other notch 14a of said blade carrier some distance above the corresponding abutment 14b. These conditions are precisely reversed with respect to the blade carrier 15, and the arms that cooperate therewith.

A braking element or shoe 60 is carried by the head 35 below the plates 56 and 57 for engagement with the tops of the blade carriers when the head is fully depressed. The braking element or shoe 60 desirably consists of a body of rubber or other resilient material, suitably attached to a metal base 61 that is fastened to the head, as, for example, by having a portion that extends upwardly between the plates 56 and 57 and is provided with apertures through which the screws 55 extend.

We will now describe the operation of our improved cutting mechanism. When pressure fluid is admitted to the cylinder 36 below the piston 37, the head 35 is instantly thrust downward until stopped by its engagement with the bumper 49. As the head descends, the right hand front arm 14c (as the parts are viewed in Figs. 2 and 3) engages the abutment 14b therebelow and turns the blade carrier 14 in a clockwise direction, while the left hand rear arm 15c acts similarly upon the rear blade carrier and rotates it in a counterclockwise direction, thereby to reverse the positions of the blades 18 and 19. Simultaneously with the foregoing action, the other arms of the two pairs are thrown outwardly away from the blade carriers, as indicated in Fig. 3, by the curved edge portions of the carriers above the horizontal axes of the latter that act as cams upon said arms. This circumstance causes the distal ends of the outwardly thrown arms to escape the ascending notches 14a and 15a into which they would otherwise fall. As the carriers stop in their reversed positions, with the braking element or shoe 60 engaged with the tops of the carriers, the arms that were previously swung free of the carriers, resume their lax condition and swing in against the carriers. Now when the head 35, with the arms suspended therefrom, returns to its normal elevated position, the distal end of one of the arms of each pair will assume a position within the adjacent notch of the corresponding carrier, like that illustrated in Fig. 2.

It may be explained that, in practice, the foregoing operation occurs so quickly that it cannot be perceived by the human eye. The only thing that can be observed is the fact that, after each operation, the positions of the blades, carriers, and arms are reversed to what they were before. It is due to this instantaneous action of the blades, that the uncured extrusions can be severed with a perfectly clean cut without distortion and without interrupting its normal continuous forward movement.

In order to prevent undue outward swinging movement of the arms 14c and 15c, due to the camming action thereon of the downwardly divergent edge portions of the carriers as the head is thrust downwardly, stops 62 may be provided. In the present construction they consist of pins 62 that are supported by and between the plates 56 and 57.

Having thus described our invention, what we claim is:

1. In cutting mechanism, two blade carriers mounted for oscillation about a common axis, a double edge shear blade supported by each carrier substantially radially of said axis and in operative relation to the blade supported by the other carrier, the blades being identical and the cutting edges of each being straight and approximately parallel and of acute angular cross section, a part movable substantially in parallelism with the plane of the carriers toward and from said axis, operative connections between said part and the carriers comprising two pairs of opposed thrust elements carried by said part and circumferentially spaced abutments incorporated in each carrier wherewith the thrust elements of the corresponding pair alternately engage for simultaneously imparting rotary motion to the carriers in reverse directions with respect to each other each time said part is moved as aforesaid whereby the blades are caused to pass each other in the performance of a cutting operation, and means for so moving said part.

2. In cutting mechanism, two blade carriers mounted for oscillation about a common axis, a double edge shear blade supported by each carrier in operative relation to the blade supported by the other carrier, a head reciprocable in substantially the plane of the carriers toward and from said axis, power means of rapid action for imparting a quick reciprocation to the head each time said power means is activated, a pair of opposed arms operatively associated with each carrier, the arms of each pair being pivoted at their proximal ends to the head and having their distal ends arranged for engagement with opposed peripheral surfaces of the corresponding carrier, each carrier having opposed abutments inset from said peripheral surfaces that are alternately engaged by the distal ends of the corresponding pair of arms in successive reciprocations of the head, the distal end of the arm opposite the one engaged with an abutment being deflected by the peripheral surface of the carrier away from the adjacent abutment of the carrier as the aforesaid part moves toward said axis, the carriers being so disposed to the respective pairs of arms that they are oscillated in reverse directions upon each reciprocation of the head, the blades being so related to the carriers that each blade is caused to pass the other in a cutting operation when the carriers are thus oscillated, and means for reciprocating the head.

3. In cutting mechanism, the combination and arrangement of parts defined by claim 2, and, in addition thereto, means carried by the head for braking engagement with the carriers when the head is moved a given distance toward said axis.

4. In cutting mechanism, two blade carriers mounted for oscillation about a common axis, a double edge shear blade supported by each carrier in operative relation to the blade supported by the other carrier, a head reciprocable in substantially the plane of the carriers toward and from said axis, a pair of opposed arms operatively associated with each carrier, the arms of each pair being pivoted at their proximal ends to the head for free swinging movement and having their distal ends arranged for engagement with opposed peripheral portions of the corresponding carrier, each carrier having opposed peripheral abutments that are alternately engaged by the distal ends of the corresponding pair of arms in successive reciprocations of the head, the distal end of the arm opposite the one engaged with an abutment being deflected by a peripheral portion of the carrier away from the adjacent abutment of the carrier as the aforesaid part moves toward said axis, stop means for limiting the outward movement of the arms, the carriers being so disposed to the respective pairs of arms that they are oscillated in reverse directions upon each reciprocation of the head, the blades being so related to the carriers that each blade is caused to pass the other in a cutting operation when the carriers are thus oscillated, and means of instantaneous action for moving the head to oscillate the carriers through the intervention of said arms.

5. In cutting mechanism, the combination and arrangement of parts defined by claim 4, and, in addition thereto, means carried by the head for braking engagement with the carriers when the head is moved a given distance toward said axis.

6. In cutting mechanism, a supporting structure, a pivotal member sustained thereby, two blade carriers in the form of discs mounted side by side for oscillation upon said pivotal member, a double edge shear blade supported by each carrier in operative relation to the shear blade supported by the other carrier, a head supported by said structure for reciprocation toward and from said pivotal member in substantially the plane of said carriers, two pairs of opposed arms pivoted at their proximal ends to said head, the opposed arms of each pair having their distal ends engaging opposed peripheral portions of the corresponding carrier, each carrier having substantially diametrically opposite peripheral notches, wall portions of said notches constituting abutments wherewith the distal ends of the arms are adapted to engage, the longitudinal axis of each of the aforesaid blades being at substantially right angles to the plane of the abutments of the corresponding carrier, and the carriers being arranged so that the blades diverge when the carriers are idle, and means of instantaneous action for imparting a quick reciprocation to the head, the distal end of one of the arms of each pair engaging one of the abutments of the corresponding carrier while the distal end of the other arm of said pair engages a peripheral portion of the carrier that deflects said other arm out of the path of the adjacent abutment of said carrier when the head is moved toward said pivotal member.

7. In cutting mechanism, the combination and arrangement of parts defined by claim 6, and, in addition thereto, a resilient element carried by the head for braking engagement with the adjacent peripheral portion of the carriers when the head is moved toward said pivotal member.

8. In cutting mechanism, a supporting structure, a pivotal member projecting horizontally therefrom, two blade carriers in the form of discs having central apertures and mounted side by side for oscillation on said pivotal member, a double edge shear blade secured to each carrier and extending radially therefrom, the blades associated with the two carriers being sustained by the carriers in downwardly diverging operative relation to each other when the carriers are idle, each carrier having substantially diametrically opposite peripheral notches in a plane substantially perpendicular to that of the axis of the corresponding blade, a head supported by said structure for reciprocation in a vertical direction above the carriers, two pairs of arms loosely pivoted at their proximal ends to laterally spaced parts of the head, the distal ends of the arms of each pair engaging the peripheral surface of the corresponding carrier above the horizontal axis of the carrier and with the distal end of one of said arms in entering relation to one of the notches of the carrier while the distal end of the other arm of said pair engages the peripheral surface of the carrier a distance above the other notch, and means of instantaneous action for reciprocating said head.

9. In cutting mechanism, the combination and arrangement of parts set forth in claim 8, and, in addition thereto, means carried by the head for braking engagement with the carriers when the head is at the bottom of its reciprocating movement.

References Cited in the file of this patent

UNITED STATES PATENTS

| | | |
|---|---|---|
| 304,293 | Case | Sept. 2, 1884 |
| 509,989 | Wilton | Dec. 5, 1893 |
| 2,042,829 | Carlin | June 2, 1936 |
| 2,232,361 | Bartlett | Feb. 18, 1941 |